US012786690B2

(12) United States Patent
Hong

(10) Patent No.: US 12,786,690 B2
(45) Date of Patent: Nov. 3, 2026

(54) GAP REQUEST METHOD AND APPARATUS, REQUEST RECEIVING METHOD AND APPARATUS, AND COMMUNICATION APPARATUS AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 289 days.

(21) Appl. No.: 18/689,670

(22) PCT Filed: Sep. 9, 2021

(86) PCT No.: PCT/CN2021/117524

§ 371 (c)(1),
(2) Date: Mar. 6, 2024

(87) PCT Pub. No.: WO2023/035199

PCT Pub. Date: Mar. 16, 2023

(65) Prior Publication Data

US 2024/0349036 A1 Oct. 17, 2024

(51) Int. Cl.
*H04W 8/20* (2009.01)
*H04W 12/45* (2021.01)
*H04W 36/14* (2009.01)

(52) U.S. Cl.
CPC ........... *H04W 8/205* (2013.01); *H04W 12/45* (2021.01); *H04W 36/14* (2013.01)

(58) Field of Classification Search
CPC ...... H04W 8/205; H04W 12/45; H04W 36/14
See application file for complete search history.

(56) References Cited

U.S. PATENT DOCUMENTS

| | | | | |
|---|---|---|---|---|
| 2023/0232368 | A1* | 7/2023 | Sabouri-Sichani ... | H04W 68/12 370/329 |
| 2024/0056792 | A1* | 2/2024 | Selvaganapathy .... | H04W 8/205 |
| 2024/0267814 | A1* | 8/2024 | Kim ...................... | H04W 76/15 |

FOREIGN PATENT DOCUMENTS

| | | | |
|---|---|---|---|
| CN | 106068015 | A | 11/2016 |
| CN | 112166634 | A | 1/2021 |
| CN | 112788745 | A | 5/2021 |

OTHER PUBLICATIONS

International Search Report issued May 26, 2022 in PCT/CN2021/117524, filed on Sep. 9, 2021, 4 pages (with English translation).

(Continued)

*Primary Examiner* — John J Lee

(74) *Attorney, Agent, or Firm* — Oblon, McClelland, Maier & Neustadt, L.L.P.

(57) ABSTRACT

The present disclosure relates to a gap request method. The method can include sending a request to a network side device, so as to request that the network side device configures, for a terminal, a gap for performing multi-SIM card connection switching. According to the present disclosure, a terminal may send a request to a network side device, so as to request that the network side device configures, for the terminal, a gap for performing multi-SIM card connection switching, such that when subsequently performing multi-SIM card connection switching, the terminal may perform multi-SIM card connection switching on the basis of the configured gap, for example, during the gap, a first SIM card stops communicating with the network side device, and is switched to a second SIM card for communication.

17 Claims, 5 Drawing Sheets

(56) References Cited

OTHER PUBLICATIONS

MUSIM Network Switching, Apple Inc. 3GPP TSG-RAN WG2 Meeting # 115 Electronic, R2-2107597, 2021. 8 pages.
MUSIM Network Switching, Apple Inc, 3GPP TSG-RAN WG2 Meeting # 114 Electronic, R2-2105085, 2021, 5 pages.

* cited by examiner

GAP REQUEST METHOD AND APPARATUS, REQUEST RECEIVING METHOD AND APPARATUS, AND COMMUNICATION APPARATUS AND STORAGE MEDIUM

CROSS REFERENCE TO RELATED APPLICATION

The present disclosure relates to the field of communication technology, and in particular, to a gap requesting method, a request receiving method, a gap requesting device, a request receiving device, a communication device, and a computer-readable storage medium.

BACKGROUND

Technical Field

The present disclosure relates to the field of communication technology, and in particular, to a gap requesting method, a request receiving method, a gap requesting device, a request receiving device, a communication device, and a computer-readable storage medium.

Description of the Related Art

In a multi-card terminal, multiple SIM (Subscriber Identity Module, user identity identification) cards can be provided, and the terminal can communicate through multiple SIM cards. For example, the terminal is provided with SIM card #1 and SIM card #2. The terminal can use SIM card #1 for communication operations, or it can use SIM card #2 for communication operations.

SUMMARY

According to a first aspect of the embodiments of the present disclosure, there is provided a gap requesting method, performed by a terminal, including sending a request to a network side device, and requesting the network side device to configure a gap for the terminal for multi-SIM card connection switching.

According to a second aspect of the embodiments of the present disclosure, there is provided a request receiving method, performed by a network side device, including receiving a request sent by a terminal, where the request is used to request the network side device to configure a gap for the terminal for multi-SIM card connection switching.

According to a third aspect of the embodiments of the present disclosure, there is provided a gap requesting device, including one or more processors, the processors being configured to send a request to a network side device to request the network side device to configure a gap for a terminal for multi-SIM card connection switching.

According to a fourth aspect of the embodiments of the present disclosure, there is provided a request receiving device, including one or more processors, the processors being configured to: receive a request sent by a terminal, where the request is used to request a network side device to configure a gap for the terminal for multi-SIM card connection switching.

According to a fifth aspect of the embodiments of the present disclosure, there is provided a communication device, including a processor and a memory configured to store a computer program. When the computer program is executed by the processor, the above-described gap requesting method is implemented.

According to a sixth aspect of the embodiments of the present disclosure, there is provided communication device, including a processor and a memory configured to store a computer program. When the computer program is executed by the processor, the above-described request receiving method is implemented.

According to a seventh aspect of the embodiments of the present disclosure, there is provided a non-transitory computer-readable storage medium for storing a computer program. When the computer program is executed by a processor, steps in the above-described gap requesting method are implemented.

According to an eighth aspect of the embodiments of the present disclosure, there is provided a non-transitory computer-readable storage medium for storing a computer program. When the computer program is executed by a processor, steps in the above-described request receiving method are implemented.

BRIEF DESCRIPTION OF THE DRAWINGS

In order to more clearly illustrate the technical solutions in the embodiments of the present disclosure, the drawings needed to be used in the description of the embodiments will be briefly introduced below. Obviously, the drawings in the following description are only some embodiments of the present disclosure. For those of ordinary skill in the art, other drawings can be obtained based on these drawings without exerting creative efforts.

DETAILED DESCRIPTION OF THE PREFERRED EMBODIMENTS

The technical solutions in the embodiments of the present disclosure will be clearly and completely described below with reference to the accompanying drawings in the embodiments of the present disclosure. Obviously, the described embodiments are only part of the embodiments of the present disclosure, not all embodiments. Based on the embodiments in the present disclosure, all other embodiments obtained by those of ordinary skill in the art without making creative efforts fall within the scope of protection of the present disclosure.

The terms used in the embodiments of the present disclosure are only for the purpose of describing specific embodiments and are not intended to limit the embodiments of the present disclosure. As used in the embodiments of the present disclosure and the appended claims, the singular forms “a”, “an” and “the” are intended to include the plural forms as well, unless the context clearly dictates otherwise. It will also be understood that the term “and/or” as used herein refers to and includes any and all possible combinations of one or more of the associated listed items.

It should be understood that although the terms first, second, third, etc. may be used to describe various information in the embodiments of the present disclosure, the information should not be limited to these terms. These terms are only used to distinguish information of the same type from each other. For example, without departing from the scope of the embodiments of the present disclosure, the first SIM card may also be called a second SIM card, and similarly, the second SIM card may also be called a first SIM card. Depending on the context, the word “if” as used herein may be interpreted as “when” or “as” or “in response to determining.”

For the purpose of simplicity and ease of understanding, the terms used herein are “greater than” or “less than”, “higher than” or “lower than” when characterizing the size relationship. But for those skilled in the art, it can be understood that the term “greater than” also covers the meaning of “greater than or equal to”, and “less than” also covers the meaning of “less than or equal to”; the term “higher than” covers the meaning of “higher than or equal to”; and the meaning of “less than” also covers the meaning of “less than or equal to”.

In some scenarios, when the terminal uses SIM card #1 for communication operations, it needs to use SIM card #2 for communication. This requires the terminal to switch between multiple SIM card connections, and switch from using SIM card #1 for communication operation to using SIM card #2 for communication.

Figure 1:
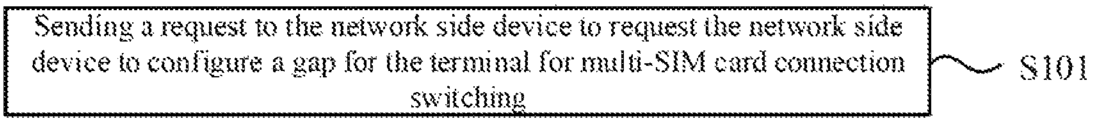
FIG. 1 is a schematic flow chart of a gap requesting method according to an embodiment of the present disclosure.

FIG. 1 is a schematic flow chart of a gap requesting method according to an embodiment of the present disclosure. The gap requesting method shown in the embodiment can be applied to a terminal, which includes but is not limited to a mobile phone, a tablet computer, a wearable device, a sensor, an Internet of Things device and other communication device. The terminal can serve as user equipment to communicate with the network side device. The network side device includes but is not limited to a network side device in 4G, 5G, 6G and other communication system, such as a base station, a core network, etc.

In one embodiment, the terminal may be provided with multiple SIM cards, which may be traditional SIM cards or eSIM cards, that is, embedded SIM cards.

The following is an exemplary description of the technical solution of the present disclosure mainly in the case where multiple SIM cards include a first SIM card and a second SIM card. The first SIM card and the second SIM card do not specifically refer to a certain SIM card, but are used to represent any two different SIM cards among multiple SIM cards. The first SIM card and the second SIM card can belong to the same operator or different operators, and can be chosen according to needs.

As shown in FIG. 1, the gap requesting method may include the following steps:

In step S101, sending a request to the network side device to request the network side device to configure a gap for the terminal for multi-SIM card connection switching.

The request may include user equipment assistance information UEAssistanceInformation signaling, and the request may be sent to the network side device in the form of adding the gap-related assistance information in the UEAssitanceInformation signaling. For example, the assistance information may be carried by adding new information element (IE) in the UEAssitanceInformation signaling. After receiving the UEAssitanceInformation signaling, the network side device can determine that the terminal is requesting a gap if the network side device determines that the assistance information is carried in the information element. The information element may be specified by a protocol, or may be determined through negotiation between the terminal and the network side device.

Of course, the assistance information can also be carried in other information and sent as needed, such as in user equipment capability information and sent to the network side device, and the request can also be sent in other forms, such as a separate request signaling, which can be selected according to needs.

In one embodiment, the multi-SIM card connection switching includes switching to the second SIM card for communication operations when communication operations are performed through the first SIM card (in this case, the communication operation through the first SIM card can be interrupted). It should be noted that multi-SIM card connection switching is not limited to the above situation. For example, it may also include activating the second SIM card to perform communication operations at the same time when performing communication operations through the first SIM card (in this case, the communication operations through the first SIM card can be performed without interruption). The following is an exemplary description of the technical solution of the present disclosure mainly for the case where multi-SIM card connection switching includes switching to a second SIM card for communication operations when communication operations are performed through the first SIM card.

In one embodiment, when the terminal uses the first SIM card for communication operations, it may be necessary to switch to the second SIM card for communication operations. For example, after the terminal uses the first SIM card to establish a communication connection with the first base station, during the process of communicating through the communication connection, it needs to use the second SIM card to perform communication operations, where using the second SIM card to communicate includes but is not limited to using the second SIM card to receive paging messages sent by the second base station, using the second SIM card to receive system messages sent by the second base station, using the second SIM card to send information to the second base station, using the second SIM card to perform measurements, and so on.

In this case, the first SIM card can stop communicating with the network side device during the period when the second SIM card is performing communication operations, and can resume communicating with the network side device after the second SIM card completes the communication operation. It can be seen that for the first SIM card and the network side device communicating with the first SIM card, when the terminal performs multi-SIM card connection switching, there is a gap in the time domain in the communication between the first SIM card and the network side device, and the terminal performs a multi-SIM card connection switching operation during this gap, for example, stops using the first SIM card for communication and switches to use the second SIM card for communication.

However, in general, the time domain resources for SIM card communication in the terminal need to be configured by the network side device, so as to ensure that the network side device and the terminal can communicate with a high degree of fit.

According to embodiments of the present disclosure, the terminal can send a request to the network side device to request the network side device to configure a gap for the terminal for multi-SIM card connection switching, so that when the terminal subsequently performs multi-SIM card connection switching, the terminal can perform multi-SIM card connection switching based on the configured gap. For example, during the gap, the first SIM card stops communicating with the network side device and the terminal switches to the second SIM card for communication.

Since the gap is configured by the network side device to the terminal, when the first SIM card in the terminal stops communicating with the network side device in the gap, the network side device can correctly determine that the terminal is performing a multi-SIM card connection switching operation, instead of having a problem communicating with the first SIM card, thereby avoiding the network side device from performing mis-operations such as increasing power and changing algorithms in order to overcome the problem.

In one embodiment, the request includes user equipment assistance information UEAssitanceInformation signaling, and the UEAssitanceInformation signaling carries assistance information to assist the network side device in configuring the gap for the terminal.

The terminal can request the network side device to configure a gap for the terminal for multi-SIM card connection switching by sending UEAssitanceInformation signaling carrying assistance information, where the assistance information can be configured to assist the network side device in configuring the gap for the terminal. For example, the assistance information may include information about the gap expected by the terminal. Accordingly, it is helpful to ensure that the network side device configures the gap for the terminal to better meet the needs of the terminal.

In one embodiment, the assistance information includes at least one of the following:

start time of the gap;

a duration of the gap;

end time of the gap;

a type of the gap, such as periodic gap, aperiodic gap;

a period of the gap; and a purpose of requesting the gap.

It should be noted that the assistance information that the terminal can report is not limited to the above. The role of the terminal reporting assistance information is to assist the network side device in configuring the gap, but it is the network side device that finally decides how to configure the gap. For example, the network side device may not refer to the assistance information at all, and only configure the gap for the terminal according to the needs of the network side device. Also, the network side device can refer to the assistance information to configure the gap for the terminal.

When the network side device configures the gap with reference to the assistance information, a parameter of the configured gap may be exactly the same as a parameter in the above assistance information, or the parameter of the configured gap may not be exactly the same as the parameter in the assistance information, but close to the parameter in the assistance information. That is, the network side device can select some parameters in the assistance information for configuration as needed.

In addition, in addition to start time, duration, end time, type, period, etc. of the gap, the assistance information can also include other content, such as the purpose of the terminal requesting the gap, and the network side device can determine whether to configure a gap for the terminal and how to configure the gap for the terminal based on the purpose.

For example, the purpose includes but is not limited to switching to the second service type corresponding to the communication operation to be performed by the second SIM card, and switching to the operation type of the communication operation to be performed by the second SIM card.

Based on different ways of classifying service type, the service type includes, for example, URLLC (Ultra Reliable Low Latency Communications) service, eMBB (Enhanced Mobile Broadband) service, etc., and can also include voice service, call service, etc. The operation type may include, for example, receiving a paging message, receiving system information, etc.

Figure 2:
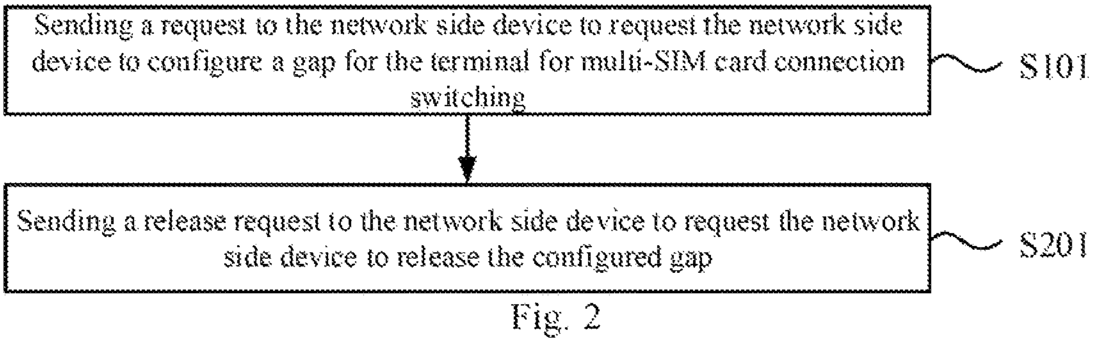
FIG. 2 is a schematic flow chart of another gap requesting method according to an embodiment of the present disclosure.

FIG. 2 is a schematic flow chart of another gap requesting method according to an embodiment of the present disclosure. As shown in FIG. 2, the method further includes:

in step S201, sending a release request to the network side device to request the network side device to release the configured gap.

In one embodiment, the terminal can send a release request to the network side device without using the gap, so that the network side device can release the gap configured for the terminal.

For example, if the terminal determines that it will not perform multi-SIM card connection switching for the coming period, and thus it will not use the gap, then it can send a release request to the network side. After receiving the release request, the network side device can release the gap configured for the terminal, and the network side device can perform normal configuration for the terminal at the time domain resource corresponding to the original gap without avoiding the gap.

Figure 3:
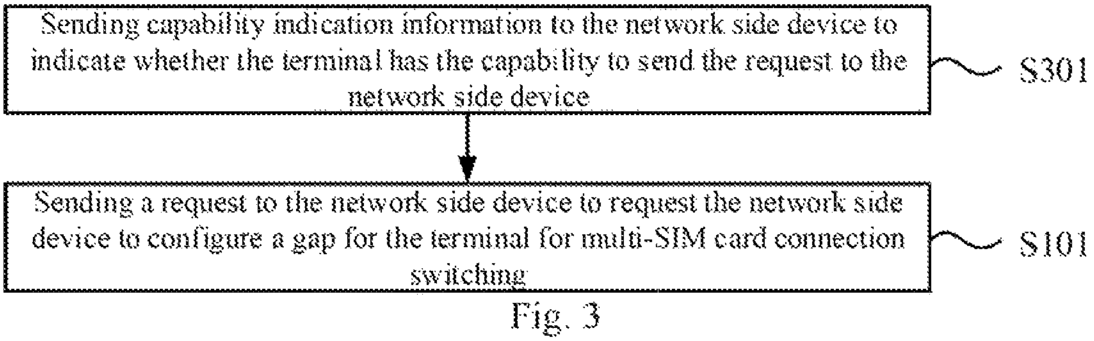
FIG. 3 is a schematic flow chart of yet another gap requesting method according to an embodiment of the present disclosure.

FIG. 3 is a schematic flow chart of yet another gap requesting method according to an embodiment of the present disclosure. As shown in FIG. 3, before sending the request to the network side device, the method further includes:

in step S301, sending capability indication information to the network side device to indicate whether the terminal has the capability to send the request to the network side device.

In one embodiment, due to the different capabilities of different terminals, for requesting the gap, some terminals have the capability of sending request to the network side device to request the gap, while some terminals do not have the capability of sending request to the network side device to request the gap.

Therefore, the terminal can determine whether it has the capability to send a request to the network side device to request the gap, and generate capability information accordingly to report to the network side device, in order to avoid the situation where the terminal cannot send the request to the network side device and the network side device configures resources for sending the request to the terminal, resulting in a waste of wireless communication resources. The capability indication information may be carried in user equipment capability information UECapabilityInformation and sent. It should be understood that the capability indication information can also be carried in other information and sent as needed, and can also be sent in other forms, such as sending in a separate request signaling. The specific selection can be made as needed, which is not limited by the present disclosure.

Figure 4:
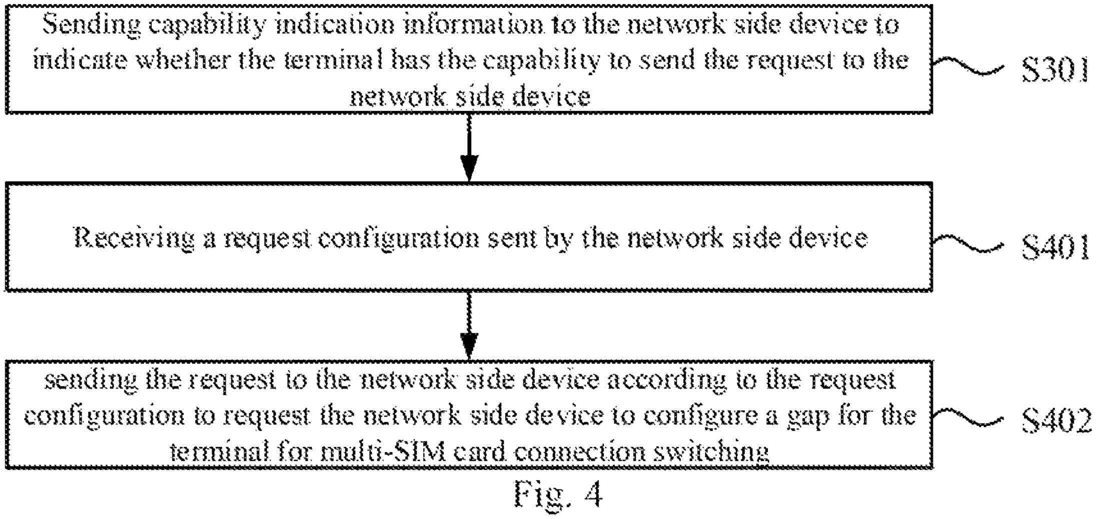
FIG. 4 is a schematic flow chart of yet another gap requesting method according to an embodiment of the present disclosure.

FIG. 4 is a schematic flow chart of yet another gap requesting method according to an embodiment of the present disclosure. As shown in FIG. 4, in the case where the terminal has the capability of sending request to the network side device, the method further includes:

- in step S401, receiving a request configuration sent by the network side device;
- where sending the request to the network side device includes:
- in step S402, sending the request to the network side device according to the request configuration.

In one embodiment, when the terminal has the capability of sending request to the network side device to request the gap, the network side device can send a request configuration to the terminal, and the request configuration can include time-frequency resources for the terminal to send the request. After receiving the request configuration, the terminal can send the request to the network side device according to the request configuration, for example, sending the request to the network side device on the time-frequency resources in the request configuration.

The network side device may pre-agree with the terminal on a signaling carrying the request configuration, or may dynamically instruct the signaling carrying the request configuration. For example, the request configuration may be carried through OtherConfig signaling.

In one embodiment, the request configuration includes at least one of the following:

- a duration of the blocking timer;
- a type of the gap that can be requested;
- whether the terminal is required to report assistance information; and
- a trigger condition for the terminal sending the request.

In one embodiment, the request configuration may include time-frequency resources for the terminal to send the request, and may also include other configurations.

For example, the request configuration includes the duration of the blocking timer. Accordingly, after each time the terminal sends the request, the blocking timer can be started. Before the blocking timer times out, the request will not be sent again, thereby avoiding the waste of resources caused by the terminal frequently sending requests repeatedly when the network side device does not configure appropriate gap for the terminal.

For example, the request configuration includes the type of gap that can be requested. This type can be the type of gap that the network side device can configure for the terminal. Based on this, the terminal can determine whether the type of gap that can be requested meets the needs. For example, the terminal needs periodic gaps, and the type of gap that can be requested is aperiodic, then the terminal can choose not to send a request, or only request periodic gaps, thereby preventing the terminal from requesting the network side device to configure a gap of a type that cannot be configured by the network side device.

For example, the request configuration includes whether the terminal is required to report assistance information. The assistance information has been described in the previous embodiments and will not be described again here. For example, if the network side device does not configure the gap for the terminal with reference to the assistance information, then the terminal does not need to report the assistance information. For example, if the network side device configures the gap for the terminal with reference to the assistance information, then the terminal is required to report the assistance information. It can only indicate that the terminal is required to report the assistance information in the request configuration. The specific types of assistance information to be reported can be pre-agreed, or can be determined by the terminal according to the actual situation. It also can specifically indicate that which types of assistance information are required to be reported by the terminal in the request configuration. The assistance information reported by the terminal may be the same as the assistance information in the embodiment shown above (for example, partially same or all the same), or it may be different (for example, partially different or fully different). Based on this, the terminal can determine whether to carry assistance information in the request sent, and can avoid the waste of resources caused by carrying assistance information in the request when the network side device does not require the terminal to report assistance information.

For example, the request configuration includes a trigger condition for the terminal to send the request, then the terminal can only send the request to the network side device when the trigger condition is met. Accordingly, it can effectively improve the ability of the network side device to control request sent by the terminal.

In one embodiment, the trigger condition includes at least one of the following:

- the communication operation performed by the first SIM card is a communication operation of the first target service type;
- the communication operation performed by the second SIM card is a communication operation of the second target service type;
- the purpose of multi-SIM card connection switching is the target purpose.

In one embodiment, based on different ways of classifying service type, the service type includes, for example, URLLC service, eMBB service, etc., and may also include voice service, call service, etc.

For example, the trigger condition includes that the communication operation to be performed by the second SIM card is a communication operation of the URLLC service. Then, before sending the request, the terminal can first determine the service type of the communication operation to be performed by the second SIM card when performing multi-SIM card connection switching. If the service type of the communication operation is URLLC service, the request can be sent to the network side to request the gap, otherwise the request is not be sent to the network side device.

The first target service type and the second target service type may include the same service type or different service types. For example, when the trigger condition includes that the communication operation performed by the first SIM card is a communication operation of the first target service type, and the communication operation performed by the second SIM card is a communication operation of the second target service type, the first target service type and the second target service type can be different. In this case, the delay allowed by the first target service type may be relatively high, and the delay allowed by the second target service type may be relatively low.

In one embodiment, the purpose of the terminal performing multi-SIM card connection switching may refer to the purpose of the communication operations to be performed by the terminal switching to the second SIM card, such as including but not limited to receiving system information and receiving paging messages, etc. For example, if the target purpose is to receive a paging message, then before sending the request, the terminal can first determine the communication operation to be performed by the second SIM card when performing multi-SIM card connection switching. If the communication operation to be performed by the second SIM card is to receive a paging message, then the terminal can send the request to the network side to request the gap, otherwise the request is not sent to the network side device.

Figure 5:
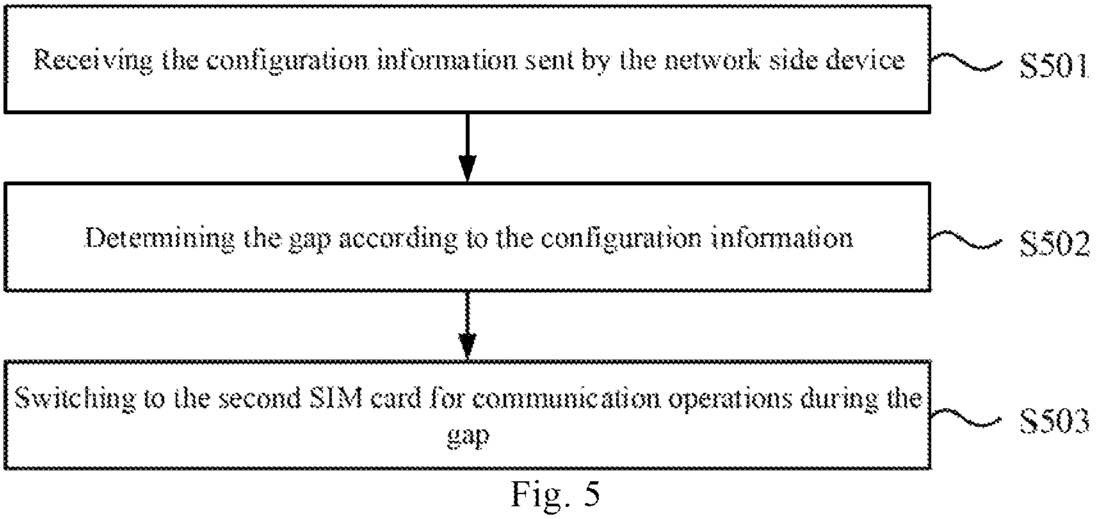
FIG. 5 is a schematic flow chart of yet another gap requesting method according to an embodiment of the present disclosure.

FIG. 5 is a schematic flow chart of yet another gap requesting method according to an embodiment of the present disclosure. As shown in FIG. 5, the method further includes:

in step S501, receiving the configuration information sent by the network side device;

in step S502, determining the gap according to the configuration information; and in step S503, switching to the second SIM card for communication operations during the gap.

In one embodiment, after receiving the request, the network side device may choose to configure a gap for the terminal, or may choose not to configure a gap for the terminal.

If choosing not to configure a gap for the terminal, request feedback information can be sent to the terminal. The request feedback information does not carry the configuration of the gap, or carries failure indication information. Accordingly, the terminal can determine that the request failed and therefore does not perform multi-SIM card connection switching.

When choosing to configure a gap for the terminal, request feedback information can be sent to the terminal. The request feedback information can carry gap configuration information, or carry success indication information to instruct the terminal to use the pre-configured gap. Accordingly, the terminal can determine that the request is successful, and thereby switch to the second SIM card for communication operations during the gap.

In one embodiment, after receiving the request, the network side device can configure the gap for the terminal. For example, the terminal sends the request through the first SIM card, and the network side device can send the gap configuration information to the first SIM card, such as the start time of the gap, the end time of the gap, the period of the gap, the duration of the gap, etc. The terminal can determine the gap in which the base station allows the terminal to perform multi-SIM card connection switching according to the configuration information, and then the terminal can perform multi-SIM card connection switching in the determined gap. For example, based on the start time of the gap and the end time of the gap, the terminal can stop using the first SIM card for communication at the start time of the gap, switch to use the second SIM card for communication, and switch to use the first SIM card for communication at the end time of the gap. Of course, depending on the actual situation, the terminal may not switch to use the first SIM card for communication at the end of the gap. For example, the terminal may still use the second SIM card for communication, or it may control both of the first SIM card and the third SIM card to enter the non-connected state.

In one embodiment, the way in which the network side device configures the gap for the terminal can be determined according to the actual situation. For example, it can be determined based on the factors such as the capability of the terminal performing multi-SIM card connection switching, the communication operation performed by the terminal through the first SIM card, the communication operations to be performed by the terminal switching to the second SIM card, etc.

As an example, the network side device configures the gap for the terminal based on the capability of multi-SIM card connection switching of the terminal.

In one embodiment, for a terminal that supports multi-SIM card connection switching, the capability of the multi-SIM card connection switching specifically supported by the terminal may vary from terminal to terminal, that is, the specific support for multi-SIM card connection switching can vary among different terminals. The terminal can report the capability of the multi-SIM card connection switching to the network side device, so that the network side device can determine the specific support of the terminal for the multi-SIM card connection switching based on the capability information, and then configure appropriate gaps for the terminal.

In one embodiment, the capability of the multi-SIM card connection switching of the terminal includes whether the terminal can perform the multi-SIM card connection switching in the case where the first condition is met, where the first condition includes at least one of the following: the first SIM card leaves the connected state and the first SIM card remains in the connected state.

For example, some terminals only support multi-SIM card connection switching in the case where the first SIM card leaves the connected state. That is, when performing communication operations through the first SIM card, if it is necessary to switch to the second SIM card for communication operation, then the first SIM card needs to leave the connected state before it can switch to the second SIM card for communication operations. Since the first SIM card occupies relatively little resources of the network side device after leaving the connected state, the gap configured by the network side device for the terminal can be relatively long.

For example, some terminals only support multi-SIM card connection switching in the case where the first SIM card remains in the connected state. That is, when performing communication operations through the first SIM card, if it is necessary to switch to the second SIM card for communication operations, then the first SIM card can remain in the connected state, or it can be switched to the second SIM card for communication operations. Since the first SIM card remains in the connected state, and it occupies a relatively large amount of resources of the network side device, the gap configured by the network side device for the terminal can be relatively short, so that the terminal can switch back to the first SIM card as soon as possible to continue communication and avoid excessive waste of resources of the network side device.

As an example, the network side device configures the gap for the terminal based on the communication operation performed by the first SIM card and/or the communication operation to be performed by the second SIM card.

In one embodiment, since the terminal uses the first SIM card to communicate with the network side device, generally the communication operation performed by the first SIM card is known to the network side device. When the terminal sends the request, information about the communication operation to be performed by the second SIM card, such as the type and expected duration of the communication operation to be performed by the second SIM card, can be reported to the network side device.

For example, the network side device can determine a first service type corresponding to the communication operation performed by the first SIM card, and a second service type corresponding to the communication operation to be performed by the second SIM card, and can determine a first priority corresponding to the first service type and a second priority corresponding to the second service type, where the priority corresponding to the service type may be related to factors such as the allowed delay of the service type and the amount of data, etc.

On this basis, if the first priority is higher than the second priority, the gap configured by the network side device for the terminal can be relatively short. If the second priority is higher than the first priority, the gap configured by the network side device for the terminal can be relatively long.

The following is an exemplary description of the technical solution of the present disclosure based on the process of dual-end interaction between the terminal and the network side device.

When the terminal needs to perform a multi-SIM card connection switching, for example, when the terminal predicts (for example, based on the time when the second SIM card needs to perform communication operations) that it will perform a multi-SIM card connection switching, it can send a UEAssitanceInformation signaling to the network side device. The assistance information of the gap can be carried in the specified IE of the UEAssitanceInformation signaling. It should be noted that the UEAssitanceInformation signaling may also include other IEs to carry other assistance information.

After the network side device receives the UEAssitanceInformation signaling, if it is determined that the specified IE carries assistance information, it can determine that the terminal is requesting a gap, and then can choose to configure the gap for the terminal and send the gap configuration to the terminal. The gap can be configured for the terminal based on the assistance information, or the gap cannot be configured for the terminal based on the assistance information.

After the terminal receives the gap configuration information, when performing multi-SIM card connection switching, the terminal can perform multi-SIM card connection switching based on the gap configuration information. For example, the gap configuration includes the start time of the gap and the end time of the gap, then the terminal can stop using the first SIM card for communication at the start time of the gap and switch to use the second SIM card for communication, and stop using the second SIM card for communication and switch to use the first SIM card for communication at the end time of the gap.

In one embodiment, before sending UEAssitanceInformation signaling to the network side device, the terminal may also send capability indication information to the network side device to inform the network side device whether the terminal can request the gap from the network side device. For example, if the terminal can request the gap from the network side device, it means that the terminal can carry the assistance information of the gap in the specified IE of the UEAssitanceInformation signaling. If the terminal cannot request the gap from the network side device, it means that the terminal cannot carry the assistance information of the gap in the specified IE of the UEAssitanceInformation signaling.

After receiving the capability information, in response to determining that the terminal can request the gap from the network side device, the network side device can send a request configuration to the terminal. The terminal can send a UEAssitanceInformation signaling carrying the assistance information of the gap to the network side device based on the request configuration.

Figure 6:
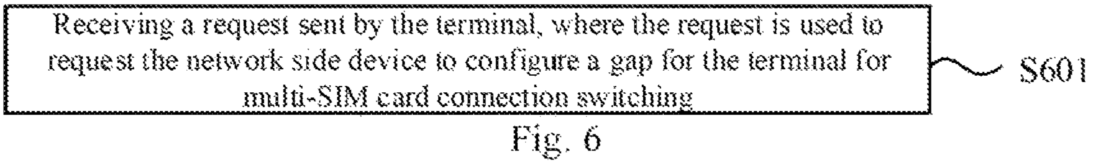
FIG. 6 is a schematic flow chart of a request receiving method according to an embodiment of the present disclosure.

FIG. 6 is a schematic flow chart of a request receiving method according to an embodiment of the present disclosure. The request receiving method shown in the present embodiment can be applied to a network side device, which includes but is not limited to a network side device in 4G, 5G, 6G and any other communication system, such as a base station, a core network, etc. The network side device can communicate with terminals, including but not limited to mobile phones, tablets, wearable devices, sensors, Internet of Things devices and other communication devices.

In one embodiment, the terminal may be provided with multiple SIM cards, which may be traditional SIM cards or eSIM cards, that is, embedded SIM cards.

The following is an exemplary description of the technical solution of the present disclosure mainly in the case where multiple SIM cards include a first SIM card and a second SIM card. The first SIM card and the second SIM card do not specifically refer to a certain SIM card, but are used to represent any two different SIM cards among multiple SIM cards. The first SIM card and the second SIM card can belong to the same operator or different operators, and can be chosen according to needs.

As shown in FIG. 6, the request receiving method may include the following steps:

in step S601, receiving a request sent by the terminal, where the request is used to request the network side device to configure a gap for the terminal for multi-SIM card connection switching.

The request may include user equipment assistance information UAssistanceInformation signaling, and the request may be sent to the network side device in the form of adding the gap-related assistance information in UEAssitanceInformation signaling. For example, a new information element IE may be added in UEAssitanceInformation signaling to carry the assistance information. After receiving the UEAssitanceInformation signaling, in response to determining that the information element carries the assistance information, the network side device can determine that the terminal is in the request gap.

Of course, the assistance information can also be carried in other information and sent as needed, for example, carried in capability information of user equipment and sent to the network side device. And the request can also be sent in other forms, for example, sent in a separate request signaling, which can be selected according to needs.

In one embodiment, the multi-SIM card connection switching includes switching to the second SIM card for communication operations when performing communication operations through the first SIM card.

In one embodiment, the multi-SIM card connection switching includes switching to the second SIM card for communication operations when performing communication operations through the first SIM card (in this case, the communication operation performed by the first SIM card can be interrupted). It should be noted that multi-SIM card connection switching is not limited to the above situation. For example, it may also include activating the second SIM card to perform communication operations at the same time when performing communication operations through the first SIM card (in this case, the communication operations through the first SIM card can be performed without interruption). The following is an exemplary description of the technical solution of the present disclosure mainly for the case where multi-SIM card connection switching includes switching to a second SIM card for communication operations when communication operations are performed through the first SIM card.

In one embodiment, when the terminal uses the first SIM card for communication operations, it may be necessary to switch to the second SIM card for communication operations. For example, after the terminal uses the first SIM card to establish a communication connection with the first base station, during the process of communicating through the communication connection, it needs to use the second SIM card to perform communication operations, where using the second SIM card to communicate includes but is not limited to using the second SIM card to receive paging messages sent by the second base station, using the second SIM card to receive system messages sent by the second base station, using the second SIM card to send information to the second base station, using the second SIM card to perform measurements, and so on.

In this case, the first SIM card can stop communicating with the network side device during the period when the second SIM card is performing communication operations, and can resume communicating with the network side device after the second SIM card completes the communication operation. It can be seen that for the first SIM card and the network side device communicating with the first SIM card, when the terminal performs multi-SIM card connection switching, there is a gap in the time domain in the communication between the first SIM card and the network side device, and the terminal performs a multi-SIM card connection switching operation during this gap, for example, stops using the first SIM card for communication and switches to use the second SIM card for communication.

However, in general, the time domain resources for SIM card communication in the terminal need to be configured by the network side device, so as to ensure that the network side device and the terminal can communication with a high degree of fit.

According to embodiments of the present disclosure, the terminal can send a request to the network side device to request the network side device to configure a gap for the terminal for multi-SIM card connection switching, so that when the terminal subsequently performs multi-SIM card connection switching, the terminal can perform multi-SIM card connection switching based on the configured gap. For example, during the gap, the first SIM card stops communicating with the network side device and the terminal switches to the second SIM card for communication.

Since this gap is configured by the network side device to the terminal, when the first SIM card in the terminal stops communicating with the network side device in the gap, the network side device can correctly determine that the terminal is performing a multi-SIM card connection switching operation, instead of having a problem communicating with the first SIM card, thereby avoiding the network side device from performing mis-operations such as increasing power and changing algorithms in order to overcome the problem.

Figure 7:
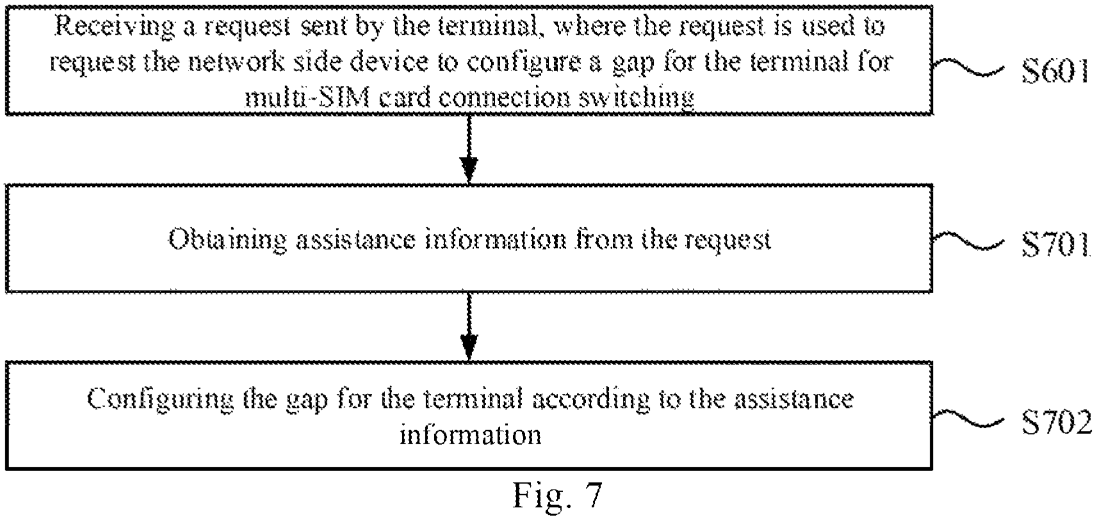
FIG. 7 is a schematic flow chart of another request receiving method according to an embodiment of the present disclosure.

FIG. 7 is a schematic flow chart of another request receiving method according to an embodiment of the present disclosure. As shown in FIG. 7, the method also includes:

in step S701, obtaining assistance information from the UEAssitanceInformation signaling; and in step S702, configuring the gap for the terminal according to the assistance information.

In one embodiment, the terminal can request the network side device to configure a gap for the terminal for multi-SIM card connection switching by sending UEAssitanceInformation signaling carrying assistance information, where the assistance information can be configured to assist the network side device in configuring the gap for the terminal. For example, the assistance information may include information about the gap expected by the terminal. Accordingly, it is helpful to ensure that the network side device configures the gap for the terminal to better meet the needs of the terminal.

In one embodiment, the assistance information includes at least one of the following:

start time of the gap;

a duration of the gap;

end time of the gap;

a type of the gap;

a period of the gap; and a purpose requesting the gap.

It should be noted that the assistance information that the terminal can report is not limited to the above. The role of the terminal reporting assistance information is to assist the network side device in configuring the gap, but it is the network side device that finally decides how to configure the gap. For example, the network side device may not refer to the assistance information at all, and only configure the gap for the terminal according to the needs of the network side device. Also, the network side device can refer to the assistance information to configure the gap for the terminal.

When the network side device configures the gap with reference to the assistance information, a parameter of the configured gap may be exactly the same as a parameter in the above assistance information, or the parameter of the configured gap may not be exactly the same as the parameter in the assistance information, but close to the parameter in the assistance information. That is, the network side device can select some parameters in the assistance information for configuration as needed.

In addition, in addition to start time, duration, end time, type, period, etc. of the gap, the assistance information can also include other content, such as the purpose of the terminal requesting the gap, and the network side device can determine whether to configure a gap for the terminal and how to configure the gap for the terminal based on the purpose.

For example, the purpose includes but is not limited to switching to the second service type corresponding to the communication operation to be performed by the second SIM card, and switching to the operation type of the communication operation to be performed by the second SIM card.

Based on different ways of classifying service type, the service type includes, for example, URLLC service, eMBB service, etc., and can also include voice service, call service, etc. The operation type may include, for example, receiving a paging message, receiving system information, etc.

Figure 8:
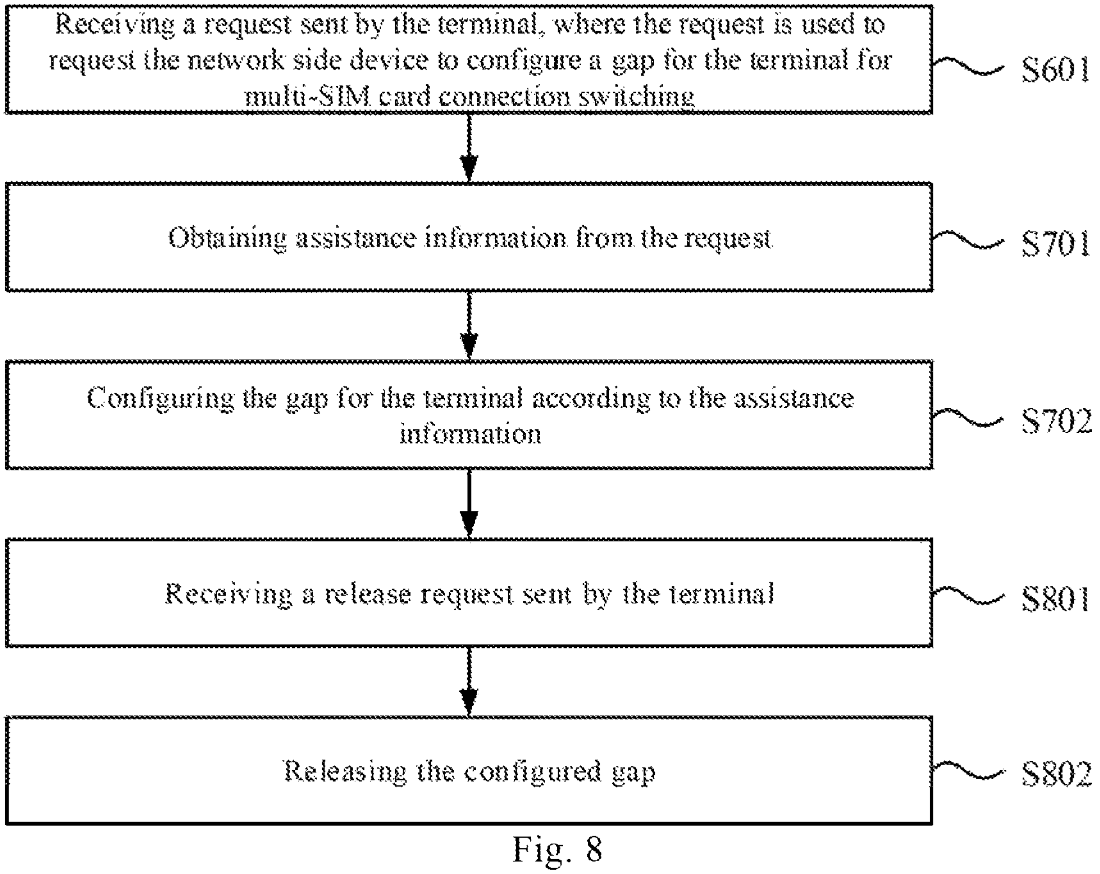
FIG. 8 is a schematic flow chart of yet another request receiving method according to an embodiment of the present disclosure.

FIG. 8 is a schematic flow chart of yet another request receiving method according to an embodiment of the present disclosure. As shown in FIG. 8, the method also includes in step S801, receiving a release request sent by the terminal, and in step S802, releasing the configured gap.

In one embodiment, the terminal can send a release request to the network side device without using the gap, so that the network side device can release the gap configured for the terminal.

For example, if the terminal determines that it will not perform multi-SIM card connection switching for the coming period, and thus it will not be use the gap, then it can send a release request to the network side. After receiving the release request, the network side device can release the gap configured for the terminal, and the network side device can perform normal configuration for the terminal at the time domain resource corresponding to the original gap without avoiding the gap.

Figure 9:
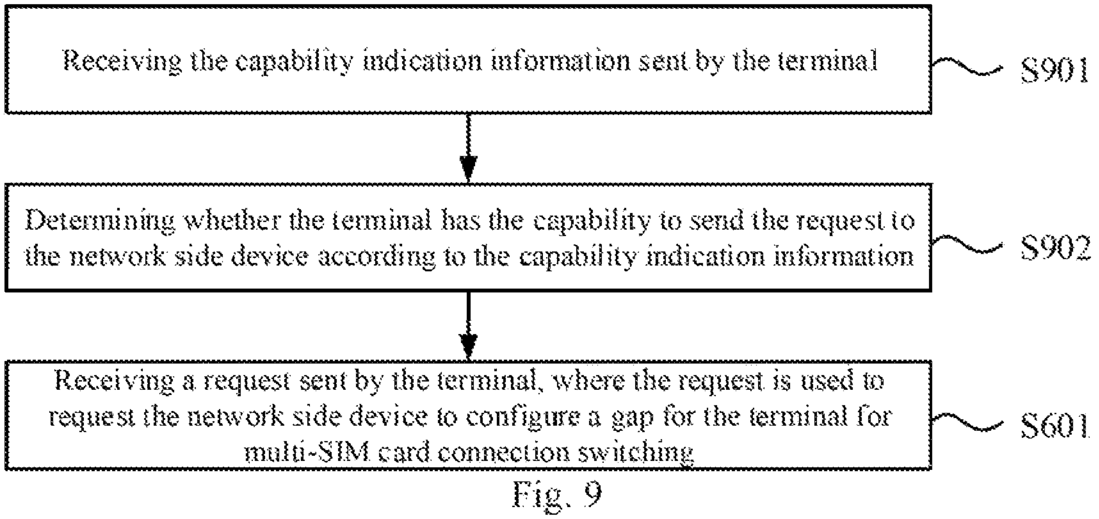
FIG. 9 is a schematic flow chart of yet another request receiving method according to an embodiment of the present disclosure.

FIG. 9 is a schematic flow chart of yet another request receiving method according to an embodiment of the present disclosure. As shown in FIG. 9, before receiving the request sent by the terminal, the method further includes in step S901, receiving the capability indication information sent by the terminal, and in step S902, determining whether the terminal has the capability to send the request to the network side device according to the capability indication information.

In one embodiment, due to the different capabilities of different terminals, for requesting gaps, some terminals have the capability of sending request to the network side device to request the gap, while some terminals do not have the capability of sending request to the network side device to request the gap.

Therefore, the terminal can determine whether it has the capability to send a request to the network side device to request the gap, and generate capability information accordingly to report to the network side device, in order to avoid the situation where the terminal cannot send the request to the network side device and the network side device configures resources for sending the request to the terminal, resulting in a waste of wireless communication resources.

Figure 10:
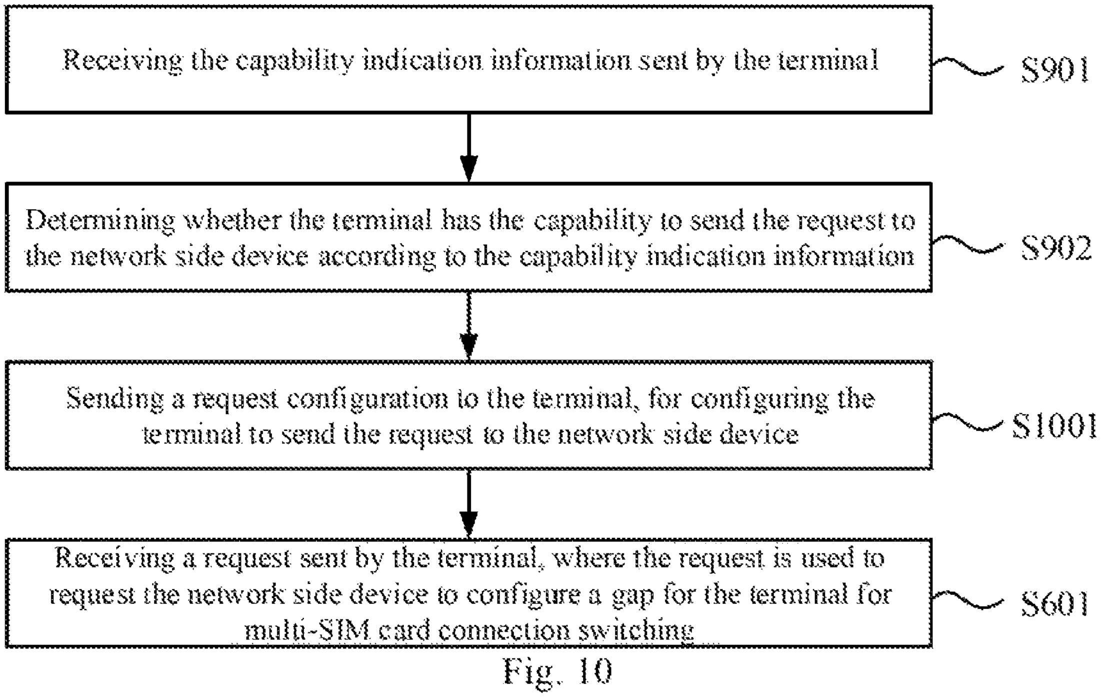
FIG. 10 is a schematic flow chart of yet another request receiving method according to an embodiment of the present disclosure.

FIG. 10 is a schematic flow chart of yet another request receiving method according to an embodiment of the present disclosure. As shown in FIG. 10, in the case where the terminal has the capability of sending request to the network side device, the method further includes in step S1001, sending a request configuration to the terminal, for configuring the terminal to send the request to the network side device.

In one embodiment, when the terminal has the capability of sending request to the network side device to request the gap, the network side device can send a request configuration to the terminal, and the request configuration can include time-frequency resources for the terminal to send the request. After receiving the request configuration, the terminal can send the request to the network side device according to the request configuration, for example, sending the request to the network side device on the time-frequency resources in the request configuration.

The network side device may pre-agree with the terminal on a signaling carrying the request configuration, or may dynamically instruct the signaling carrying the requesting configuration. For example, the request configuration may be carried through OtherConfig signaling.

In one embodiment, the request configuration includes at least one of the following:

a duration of the blocking timer;

a type of the gap that can be requested;

whether the terminal is required to report assistance information;

a trigger condition for the terminal sending the request; and a signaling configured to carry the request configuration.

In one embodiment, the request configuration may include time-frequency resources for the terminal to send the request, and may also include other configurations.

For example, the request configuration includes the duration of the blocking timer. Accordingly, after each time the terminal sends the request, the blocking timer can be started. Before the blocking timer times out, the request will not be sent again, thereby avoiding the waste of resources caused by the terminal frequently sending requests repeatedly when the network side device does not configure appropriate gap for the terminal.

For example, the request configuration includes the type of gap that can be requested. This type can be the type of gap that the network side device can configure for the terminal. Based on this, the terminal can determine whether the type of gap that can be requested meets the needs. For example, the terminal needs periodic gaps, and the type of gap that can be requested is aperiodic, then the terminal can choose not to send a request, or only request periodic gaps, thereby preventing the terminal from requesting the network side device to configure a gap of a type that cannot be configured by the network side device.

For example, the request configuration includes whether the terminal is required to report assistance information. The assistance information has been described in the previous embodiments and will not be described again here. For example, if the network side device does not configure the gap for the terminal with reference to the assistance information, then the terminal does not need to report the assistance information. For example, if the network side device configures the gap for the terminal with reference to the assistance information, then the terminal is required to report the assistance information. It can only indicate that the terminal is required to report assistance information in the request configuration. The specific types of assistance information to be reported can be pre-agreed, or can be determined by the terminal according to the actual situation. It also can specifically indicate that which types of assistance information are required to be reported by the terminal in the request configuration. The assistance information reported by the terminal may be the same as the assistance information in the embodiment shown above (for example, partially same or all the same), or it may be different (for example, partially different or fully different). Based on this, the terminal can determine whether to carry assistance information in the request sent, and can avoid the waste of resources caused by carrying assistance information in the request when the network side device does not require the terminal to report assistance information.

For example, the request configuration includes a trigger condition for the terminal to send the request, then the terminal can only send the request to the network side device when the trigger condition is met. Accordingly, it can effectively improve the ability of the network side device to control request sent by the terminal.

In one embodiment, the trigger condition includes at least one of the following:

the communication operation performed by the first SIM card is a communication operation of the first target service type, the communication operation performed by the second SIM card is a communication operation of the second target service type, and the purpose of multi-SIM connection switching is the target purpose.

In one embodiment, based on different ways of classifying service type, the service types includes, for example, URLLC service, eMBB service, etc., and may also include voice service, call service, etc.

For example, the trigger condition includes that the communication operation to be performed by the second SIM card is a communication operation of the URLLC service. Then, before sending the request, the terminal can first determine the service type of the communication operation to be performed by the second SIM card when performing multi-SIM card connection switching. If the service type of the communication operation is URLLC service, the request can be sent to the network side to request the gap, otherwise the request is not be sent to the network side device.

The first target service type and the second target service type may include the same service type or different service types. For example, when the trigger condition includes that the communication operation performed by the first SIM card is a communication operation of the first target service type, and the communication operation performed by the second SIM card is a communication operation of the second target service type, the first target service type and the second target service type may be different. In this case, the delay allowed by the first target service type may be relatively high, and the delay allowed by the second target service type may be relatively low.

In one embodiment, the purpose of the terminal performing multi-SIM card connection switching may refer to the purpose of the communication operations to be performed by the terminal switching to the second SIM card, such as including but not limited to receiving system information and receiving paging messages, etc. For example, if the target purpose is to receive a paging message, then before sending the request, the terminal can first determine the communication operation to be performed by the second SIM card when performing multi-SIM card connection switching. If the communication operation to be performed by the second SIM card is to receive a paging message, then the terminal can send the request to the network side to request the gap, otherwise the request is not sent to the network side device.

In one embodiment, the method further includes sending the configuration information of the gap to the terminal.

In one embodiment, after receiving the request, the network side device can configure the gap for the terminal. For example, the terminal sends the request through the first SIM card, and the network side device can send the configuration information of the gap to the first SIM card, such as the start time of the gap, the end time of the gap, the period of the gap, the duration of the gap, etc. The terminal can determine the gap in which the base station allows the terminal to perform multi-SIM card connection switching according to the configuration information, and then the terminal can perform multi-SIM card connection switching in the determined gap. For example, based on the start time of the gap and the end time of the gap, the terminal can stop using the first SIM card for communication at the start time of the gap, switch to use the second SIM card for communication, and switch to use the first SIM card for communication at the end time of the gap. Of course, depending on the actual situation, the terminal may not switch to use the first SIM card for communication at the end of the gap. For example, it may still use the second SIM card for communication, or it may control both of the first SIM card and the third SIM card to enter the non-connected state.

In one embodiment, the way in which the network side device configures the gap for the terminal can be determined according to the actual situation. For example, it can be determined based on the factors such as the capability of the terminal performing multi-SIM card connection switching, the communication operation performed by the terminal through the first SIM card, the communication operations to be performed by the terminal switching to the second SIM card, etc.

As an example, the network side device configures the gap for the terminal based on the capability of multi-SIM card connection switching of the terminal.

In one embodiment, for a terminal that supports multi-SIM card connection switching, the capability of the multi-SIM card connection switching specifically supported by the terminal may vary from terminal to terminal, that is, the specific support for multi-SIM card connection switching may vary among different terminals. The terminal can report the capability of the multi-SIM card connection switching to the network side device, so that the network side device can determine the specific support of the terminal for the multi-SIM card connection switching based on the capability information, and then configure appropriate gaps for the terminal.

In one embodiment, the capability of the multi-SIM card connection switching of the terminal includes whether the terminal can perform the multi-SIM card connection switching in the case where the first condition is met, where the first condition includes at least one the following: the first SIM card leaves the connected state and the first SIM card remains in the connected state.

For example, some terminals only support multi-SIM card connection switching in the case where the first SIM card leaves the connected state. That is, when performing communication operations through the first SIM card, if it is necessary to switch to the second SIM card for communication operation, then the first SIM card needs to leave the connected state before it can switch to the second SIM card for communication operations. Since the first SIM card occupies relatively little resources of the network side device after leaving the connected state, the gap configured by the network side device for the terminal can be relatively long.

For example, some terminals only support multi-SIM card connection switching in the case where the first SIM card remains in the connected state. That is, when performing communication operations through the first SIM card, if it is necessary to switch to the second SIM card for communication operations, then the first SIM card can remain in the connected state, or it can be switched to the second SIM card for communication operations. Since the first SIM card remains in the connected state, and it occupies a relatively large amount of resources of the network side device, the gap configured by the network side device for the terminal can be relatively short, so that the terminal can switch back to the first SIM card as soon as possible to continue communication and avoid excessive waste of resources of the network side device.

As an example, the network side device configures the gap for the terminal based on the communication operation performed by the first SIM card and/or the communication operation to be performed by the second SIM card.

In one embodiment, since the terminal uses the first SIM card to communicate with the network side device, generally the communication operation performed by the first SIM card is known to the network side device. When the terminal sends the request, information about the communication operation to be performed by the second SIM card, such as the type and expected duration of the communication operation to be performed by the second SIM card, can be reported to the network side device.

For example, the network side device can determine a first service type corresponding to the communication operation performed by the first SIM card, and a second service type corresponding to the communication operation to be performed by the second SIM card, and can determine a first priority corresponding to the first service type and a second priority corresponding to the second service type, where the priority corresponding to the service type may be related to factors such as the allowed delay of the service type and the amount of data, etc.

On this basis, if the first priority is higher than the second priority, the gap configured by the network side device for the terminal can be relatively short. If the second priority is higher than the first priority, the gap configured by the network side device for the terminal can be relatively long.

The following is an exemplary description of the technical solution of the present disclosure based on the process of dual-end interaction between the terminal and the network side device.

When the terminal needs to perform a multi-SIM card connection switching, for example, when the terminal predicts (for example, based on the time when the second SIM card needs to perform communication operations) that it will perform a multi-SIM card connection switching, it can send a UEAssitanceInformation signaling to the network side device. The assistance information of the gap can be carried in the specified IE of the UEAssitanceInformation signaling. It should be noted that the UEAssitanceInformation signaling may also include other IEs to carry other assistance information.

After the network side device receives the UEAssitanceInformation signaling, if it is determined that the specified IE carries assistance information, it can determine that the terminal is requesting a gap, and then can choose to configure the gap for the terminal and send the gap configuration to the terminal. The gap can be configured for the terminal based on the assistance information, or the gap cannot be configured for the terminal based on the assistance information.

After the terminal receives the gap configuration information, when performing multi-SIM card connection switching, the terminal can perform multi-SIM card connection switching based on the gap configuration information. For example, the gap configuration includes the start time of the gap and the end time of the gap, then the terminal can stop using the first SIM card for communication at the start time of the gap and switch to use the second SIM card for communication, and stop using the second SIM card for communication and switch to use the first SIM card for communication at the end time of the gap.

In one embodiment, before sending UEAssitanceInformation signaling to the network side device, the terminal may also send capability indication information to the network side device to inform the network side device whether the terminal can request the gap from the network side device. For example, if the terminal can request the gap from the network side device, it means that the terminal can carry the assistance information of the gap in the specified IE of the UEAssitanceInformation signaling. If the terminal cannot request the gap from the network side device, it means that the terminal cannot carry the assistance information of the gap in the specified IE of the UEAssitanceInformation signaling.

After receiving the capability information, in response to determining that the terminal can request the gap from the network side device, the network side device can send a request configuration to the terminal. The terminal can send a UEAssitanceInformation signaling carrying the assistance information of the gap to the network side device based on the request configuration.

Corresponding to the foregoing embodiments of the gap requesting method and the request receiving method, the present disclosure also provides embodiments of the gap requesting device and the request receiving device.

Embodiments of the present disclosure also propose a gap request device, which can be applied to a terminal, including but not limited to communication device such as a mobile phone, a tablet computer, a wearable device, a sensor, and an Internet of Things device. The terminal can serve as user equipment to communicate with the network side device. The network side device includes but is not limited to a network side device in 4G, 5G, 6G and other communication system, such as base stations, a core network, etc.

In one embodiment, the terminal may be provided with multiple SIM cards, which may be traditional SIM cards or eSIM cards, that is, embedded SIM cards.

The following is an exemplary description of the technical solution of the present disclosure mainly in the case where multiple SIM cards include a first SIM card and a second SIM card. The first SIM card and the second SIM card do not specifically refer to a certain SIM card, but are used to represent any two different SIM cards among multiple SIM cards. The first SIM card and the second SIM card can belong to the same operator or different operators, and can be chosen according to needs.

In one embodiment, the gap request device includes one or more processors. The processor is configured to: send a request to the network side device to request the network side device to configure a gap for the terminal for multi-SIM card connection switching.

In one embodiment, the multi-SIM card connection switching includes switching to the second SIM card for communication operations when performing communication operations through the first SIM card.

In one embodiment, the request carries assistance information to assist the network side device in configuring the gap for the terminal.

In one embodiment, the assistance information includes at least one of the following: start time of the gap; duration of the gap; end time of the gap; type of gap; period of the gap; purpose of requesting the gap.

In one embodiment, the processor is further configured to: send a release request to the network side device to request the network side device to release the configured gap.

In one embodiment, the processor is further configured to: send capability indication information to the network side device to indicate whether the terminal has the capability to send the request to the network side device.

In one embodiment, in the case where the terminal has the capability to send the request to the network side device, the processor is further configured to: receive the request configuration sent by the network side device; where sending the request to the network side device includes: sending the request to the network side device based on the request configuration.

In one embodiment, the request configuration includes at least one of the following: the duration of the blocking timer; the type of gap that can be requested; whether the terminal is required to report assistance information; the trigger condition for the terminal sending the request.

In one embodiment, the trigger condition includes at least one of the following: the communication operation performed by the first SIM card is a communication operation of the first target service type; the communication operation performed by the second SIM card is a communication operation of the second target service type; the purpose of multi-SIM connection switching is the target purpose.

In one embodiment, the processor is further configured to: determine the gap according to the configuration information sent by the network side device; and switch to the second SIM card for communication operations in the gap.

Embodiments of the present disclosure also propose a request receiving device, which can be applied to a network side device. The network side device includes but is not limited to a network side device in 4G, 5G, 6G and other communication system, such as a base station, a core network, etc. The network side device can communicate with terminals, including but not limited to mobile phones, tablet computers, wearable devices, sensors, Internet of Things devices and other communication devices.

In one embodiment, the terminal may be provided with multiple SIM cards, which may be traditional SIM cards or eSIM cards, that is, embedded SIM cards.

The following is an exemplary description of the technical solution of the present disclosure mainly in the case where multiple SIM cards include a first SIM card and a second SIM card. The first SIM card and the second SIM card do not specifically refer to a certain SIM card, but are used to represent any two different SIM cards among multiple SIM cards. The first SIM card and the second SIM card can belong to the same operator or different operators, and can be chosen according to needs.

In one embodiment, the request receiving device includes one or more processors, the processor is configured to: receive a request sent by a terminal, where the request is used to request the network side device to configure a gap for the terminal for multi-SIM card connection switching.

In one embodiment, the multi-SIM card connection switching includes switching to the second SIM card for communication operations when performing communication operations through the first SIM card.

In one embodiment, the processor is further configured to: obtain assistance information from the UEAssitanceInformation signaling; and configure the gap for the terminal according to the assistance information.

In one embodiment, the assistance information includes at least one of the following: start time of the gap; duration of the gap; end time of the gap; type of gap; period of the gap; purpose of requesting the gap.

In one embodiment, the processor is further configured to: receive a release request sent by the terminal; and release the configured gap.

In one embodiment, the processor is further configured to: receive capability indication information sent by the terminal; and determine whether the terminal has the capability to send the capability indication information to the network side device according to the capability indication information.

In one embodiment, in the case where the terminal has the capability to send the request to the network side device, the processor is further configured to: send a request configuration to the terminal for configuring the terminal to send the request to the network side device.

In one embodiment, the request configuration includes at least one of the following: the duration of the blocking timer; the type of gap that can be requested; whether the terminal is required to report assistance information; the trigger condition for the terminal sending the request; and signaling carrying the request configuration.

In one embodiment, the trigger condition includes at least one of the following: the communication operation performed by the first SIM card is a communication operation of the first target service type; the communication operation performed by the second SIM card is a communication operation of the second target service type; and the purpose of multi-SIM connection switching is the target purpose.

Regarding the devices in the above embodiments, the specific manner in which each module performs operations has been described in detail in the embodiments of the relevant methods, and will not be elaborated here.

As for the device embodiment, since it basically corresponds to the method embodiment, please refer to the partial description of the method embodiment for relevant details. The device embodiments described above are only illustrative. The modules described as separate components may or may not be physically separated. The components shown as modules may or may not be physical modules, that is, they may be located in one place, or it can be distributed to multiple network modules. Some or all of the modules can be selected according to actual needs to achieve the purpose of the solution of this embodiment. Those skilled in the art can understand and implement the method without any creative effort.

An embodiment of the present disclosure also proposes a communication device, including: a processor; a memory for storing a computer program; wherein, when the computer program is executed by the processor, the gap requesting method described in any of the above embodiments is implemented.

An embodiment of the present disclosure also proposes a communication device, including: a processor; a memory for storing a computer program; wherein, when the computer program is executed by the processor, the request receiving method described in any of the above embodiments is implemented.

Embodiments of the present disclosure also provide a computer-readable storage medium for storing a computer program. When the computer program is executed by a processor, the steps in the gap requesting method described in any of the above embodiments are implemented.

Embodiments of the present disclosure also propose a computer-readable storage medium for storing a computer program. When the computer program is executed by a processor, the steps in the request receiving method described in any of the above embodiments are implemented.

Figure 11:
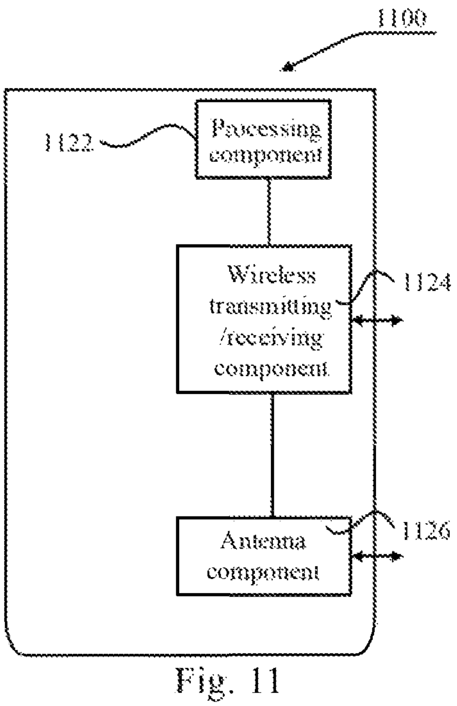
FIG. 11 is a schematic block diagram of a request receiving device according to an embodiment of the present disclosure.

As shown in FIG. 11, FIG. 11 is a schematic block diagram of a request receiving device 1100 according to an embodiment of the present disclosure. The device 1100 may be provided as a base station. Referring to FIG. 11, the device 1100 includes a processing component 1122, a wireless transmitting/receiving component 1124, an antenna component 1126, and a signal processing portion specific to the wireless interface. The processing component 1122 may further include one or more processors. One of the processors in the processing component 1122 may be configured to implement the request receiving method described in any of the above embodiments.

Figure 12:
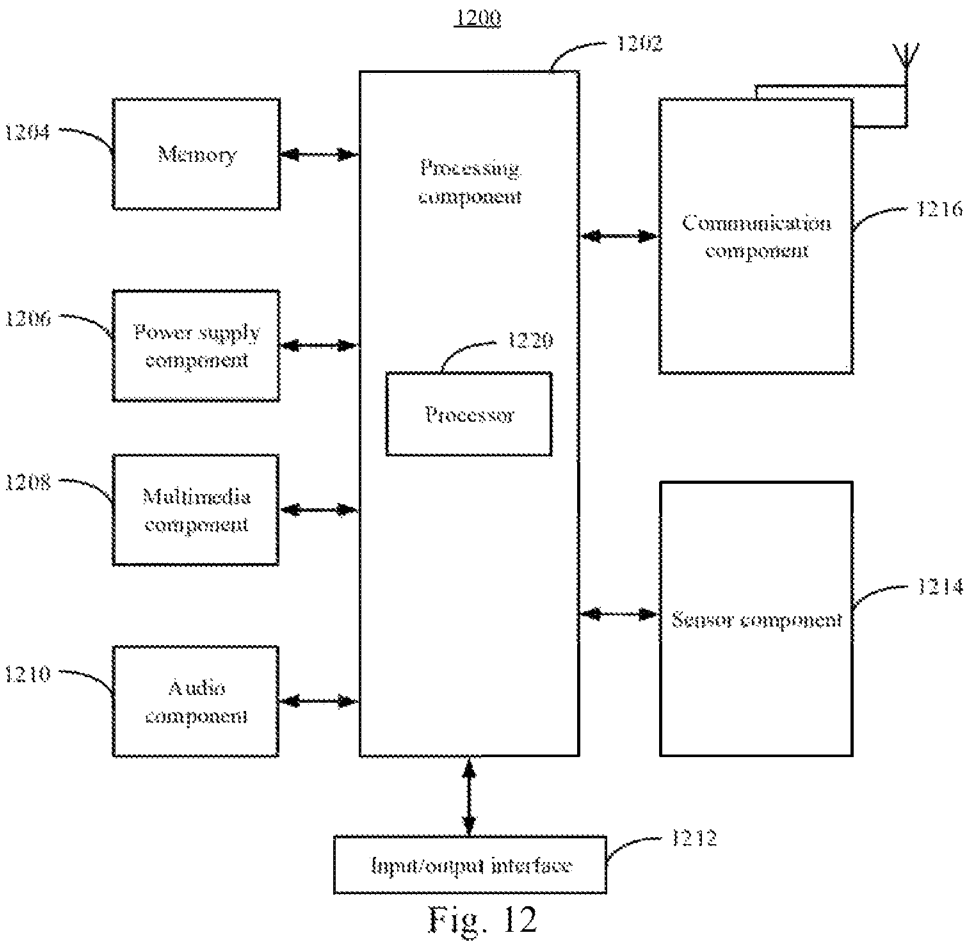
FIG. 12 is a schematic block diagram of a gap requesting device according to an embodiment of the present disclosure.

FIG. 12 is a schematic block diagram of a gap requesting device 1200 according to an embodiment of the present disclosure. For example, the device 1200 may be a mobile phone, a computer, a digital broadcast terminal, a messaging device, a game console, a tablet device, a medical device, a fitness device, a personal digital assistant, or the like.

Referring to FIG. 12, the device 1200 may include one or more of the following components: a processing component

1202, a memory 1204, a power supply component 1206, a multimedia component 1208, an audio component 1210, an input/output (I/O) interface 1212, a sensor component 1214, and a communication component 1216.

The processing component 1202 generally controls the overall operations of device 1200, such as operations associated with display, phone calls, data communications, camera operations, and recording operations. The processing component 1202 may include one or more processors 1220 to execute instructions to complete all or part of the steps of the gap requesting method described above. Additionally, the processing component 1202 may include one or more modules that facilitate interaction between the processing component 1202 and other components. For example, the processing component 1202 may include a multimedia module to facilitate interaction between multimedia component 1208 and processing component 1202.

The memory 1204 is configured to store various types of data to support operations at device 1200. Examples of such data include instructions for any application or method operating on device 1200, contact data, phonebook data, messages, pictures, videos, etc. The memory 1204 may be implemented by any type of volatile or non-volatile storage device, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk.

The power supply component 1206 provides power to various components of the device 1200. The power supply components 1206 may include a power management system, one or more power supplies, and other components associated with generating, managing, and distributing power to the device 1200.

The multimedia component 1208 includes a screen that provides an output interface between the device 1200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or slide action, but also detect the duration and pressure associated with the touch or slide action. In some embodiments, the multimedia component 1208 includes a front camera and/or a rear camera. When the device 1200 is in an operating mode, such as a shooting mode or a video mode, the front camera and/or the rear camera may receive external multimedia data. Each of the front camera and the rear camera can be a fixed optical lens system or have a focal length and optical zoom capabilities.

The audio component 1210 is configured to output and/or input audio signals. For example, the audio component 1210 includes a microphone (MIC) configured to receive external audio signals when device 1200 is in operating modes, such as call mode, recording mode, and voice recognition mode. The received audio signals may be further stored in the memory 1204 or sent via the communication component 1216. In some embodiments, the audio component 1210 also includes a speaker for outputting audio signals.

The I/O interface 1212 provides an interface between the processing component 1202 and the peripheral interface module. The peripheral interface module may be a keyboard, a click wheel, a button, etc. These buttons may include, but are not limited to: Home button, Volume buttons, Start button, and Lock button.

The sensor component 1214 includes one or more sensors for providing various aspects of status assessment for device 1200. For example, the sensor component 1214 can detect the open/closed state of the device 1200, the relative positioning of components, such as the display and keypad of the device 1200, and the sensor component 1214 can also detect a change in position of the device 1200 or a component of the device 1200, the presence or absence of user contact with device 1200, the orientation or acceleration/deceleration of the device 1200 and a temperature change of device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between device 1200 and other devices. The device 1200 can access a wireless network based on any communication standard, such as WiFi, 2G or 3G, 4G LTE, 5G NR, or a combination thereof. In one exemplary embodiment, the communication component 1216 receives broadcast signals or broadcast related information from an external broadcast management system via a broadcast channel. In one exemplary embodiment, the communications component 1216 also includes a near field communications (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1200 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic component, and is configured to perform the above gap requesting method.

In an exemplary embodiment, there is also provided a non-transitory computer-readable storage medium including instructions, such as a memory 1204 including instructions. The instructions are executable by the processor 1220 of the device 1200 to complete the above gap requesting method. For example, the non-transitory computer-readable storage medium may be ROM, random access memory (RAM), CD-ROM, magnetic tape, floppy disk, optical data storage device, etc.

Other embodiments of the disclosure will be readily apparent to those skilled in the art from consideration of the specification and practice of the disclosure disclosed herein. The present disclosure is intended to cover any variations, uses, or adaptations of the disclosure that follow the general principles of the disclosure and include common knowledge or customary technical means in the technical field that are not disclosed in the disclosure. It is intended that the specification and embodiments be considered as exemplary only, with a true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the disclosure is limited only by the appended claims.

It should be noted that in this article, relational terms such as first and second are only used to distinguish one entity or operation from another entity or operation, and do not necessarily require or imply the existence of any such actual relationship or sequence between these entities or operations. The terms "includes", "include" or any other variation thereof are intended to cover a non-exclusive inclusion such that a process, method, article or device including a list of elements includes not only those elements but also others not expressly listed elements, or elements inherent to such process, method, article or device. Without further limitation, an element defined by the statement "includes a . . . " does not exclude the presence of additional identical elements in a process, method, article, or device that includes the stated element.

The methods and devices provided by the embodiments of the present disclosure are introduced in detail above. Specific examples are used in this article to illustrate the principles and embodiments of the present disclosure. The description of the above embodiments is only used to help understand the methods and their core ideas of the present disclosure; at the same time, for those skilled in the art, there will be changes in the embodiments and application scope based on the ideas of the present disclosure. In summary, the content of this specification should not be understood as a limitation to the present disclosure.

What is claimed is:

1. A gap requesting method, performed by a terminal, comprising:

sending a request to a network side device, and requesting the network side device to configure a gap for the terminal for multi-SIM card connection switching, wherein the terminal is provided with multiple SIM cards, the multiple SIM cards at least comprise a first SIM card and a second SIM card, and the multi-SIM card connection switching comprises switching to the second SIM card for communication operations when the communication operations are performed through the first SIM card, wherein a trigger condition for the terminal sending the request comprises at least one of the following:

a communication operation performed by the first SIM card is a communication operation of a first target service type;

a communication operation performed by the second SIM card is a communication operation of a second target service type; or a purpose of multi-SIM connection switching is a target purpose.

2. The method according to claim 1, wherein the request comprises user equipment assistance information (UEAssistanceInformation) signaling, and the UEAssitanceInformation signaling carries assistance information for assisting the network side device to configure the gap for the terminal.

3. The method according to claim 2, wherein that the assistance information comprises at least one of the following:

start time of the gap;

a duration of the gap;

end time of the gap;

a type of gap;

a period of the gap; and a purpose of requesting the gap.

4. The method of claim 1, further comprising:

sending a release request to the network side device, and requesting the network side device to release the configured gap.

5. The method of claim 1, further comprising:

sending capability indication information to the network side device, for indicating whether the terminal has a capability to send the request to the network side device.

6. The method according to claim 5, wherein in the case where the terminal has the capability to send the request to the network side device, the method further comprises:

receiving a request configuration sent by the network side device;

wherein, sending the request to the network side device comprises:

sending the request to the network side device according to the request configuration.

7. The method according to claim 6, wherein the request configuration comprises at least one of the following:

a duration of a blocking timer;

a type of a gap that can be requested;

whether the terminal is required to report assistance information; and a trigger condition for the terminal sending the request.

8. The method of claim 1, further comprising:

receiving configuration information sent by the network side device;

determining the gap based on the configuration information; and switching to the second SIM card for communication operations during the gap.

9. A request receiving method, performed by a network side device, comprising:

receiving a request sent by a terminal, wherein the request is used to request the network side device to configure a gap for the terminal for multi-SIM card connection switching, wherein the terminal is provided with multiple SIM cards, the multiple SIM cards at least comprise a first SIM card and a second SIM card, and the multi-SIM card connection switching comprises switching to the second SIM card for communication operations when the communication operations are performed through the first SIM card, wherein a trigger condition for the terminal sending the request comprises at least one of the following:

a communication operation performed by the first SIM card is a communication operation of a first target service type;

a communication operation performed by the second SIM card is a communication operation of a second target service type; or a purpose of multi-SIM connection switching is a target purpose.

10. The method according to claim 9, wherein the request comprises user equipment assistance information (UEAssistanceInformation) signaling, and the method further comprises:

obtaining assistance information from the UEAssitanceInformation signaling; and configuring the gap for the terminal according to the assistance information.

11. The method of claim 9, further comprising:

receiving a release request sent by the terminal;

releasing the configured gap.

12. The method of claim 9, further comprising:

receiving capability indication information sent by the terminal;

determining whether the terminal has a capability to send the request to the network side device according to the capability indication information.

13. The method according to claim 12, wherein in the case where the terminal has the capability to send the request to the network side device, the method further comprises:

sending a request configuration to the terminal for configuring the terminal to send the request to the network side device.

14. The method according to claim 13, wherein the request configuration comprises at least one of the following:

a duration of the blocking timer;

a type of a gap that can be requested;

whether the terminal is required to report assistance information;

a trigger condition for the terminal sending the request; and a signaling configured to carry the request configuration.

15. The method according to claim 9, further comprising:

sending configuration information of the gap to the terminal.

16. A communication device, comprising:

a processor;

a memory configured to store a computer program;

wherein, when the computer program is executed by the processor, the request receiving method according to claim 9 is implemented.

17. A communication device, comprising:

a processor;

a memory configured to store a computer program;

wherein, when the computer program is executed by the processor, the processor is configured to:

sending a request to a network side device, and requesting the network side device to configure a gap for the terminal for multi-SIM card connection switching, wherein the terminal is provided with multiple SIM cards, the multiple SIM cards at least comprise a first SIM card and a second SIM card, and the multi-SIM card connection switching comprises switching to the second SIM card for communication operations when the communication operations are performed through the first SIM card, wherein a trigger condition for the terminal sending the request comprises at least one of the following:

a communication operation performed by the first SIM card is a communication operation of a first target service type;

a communication operation performed by the second SIM card is a communication operation of a second target service type; or a purpose of multi-SIM connection switching is a target purpose.

* * * * *